(12) United States Patent
Curtis et al.

(10) Patent No.: US 8,789,596 B2
(45) Date of Patent: Jul. 29, 2014

(54) METHOD OF INCREASING EFFICIENCY IN A HYDRAULIC FRACTURING OPERATION

(75) Inventors: James Andrew Curtis, Conroe, TX (US); Julio Rodolfo Gomez Casanova, Bogota (CO)

(73) Assignee: Baker Hughes Incorporated, Houston, TX (US)

(*) Notice: Subject to any disclaimer, the term of this patent is extended or adjusted under 35 U.S.C. 154(b) by 266 days.

(21) Appl. No.: 13/359,684

(22) Filed: Jan. 27, 2012

(65) Prior Publication Data

US 2013/0192837 A1 Aug. 1, 2013

(51) Int. Cl.
*E21B 43/26* (2006.01)
(52) U.S. Cl.
USPC ............ 166/281; 166/307; 166/308.2
(58) Field of Classification Search
None
See application file for complete search history.

(56) References Cited

U.S. PATENT DOCUMENTS

| | | | |
|---|---|---|---|
| 3,363,690 A | 1/1968 | Fischer et al. | |
| 3,547,197 A * | 12/1970 | Mathews et al. | 166/284 |
| 3,613,789 A | 10/1971 | Son, Jr. et al. | |
| 4,194,566 A * | 3/1980 | Maly | 166/307 |
| 5,529,125 A | 6/1996 | Di Lullo Arias et al. | |
| 6,443,230 B1 | 9/2002 | Boles et al. | |
| 6,767,869 B2 | 7/2004 | DiLullo | |
| 7,059,414 B2 | 6/2006 | Rae et al. | |
| 7,086,469 B2 | 8/2006 | Metcalf et al. | |
| 7,156,178 B2 | 1/2007 | Rae et al. | |
| 7,220,709 B1 | 5/2007 | Qu et al. | |
| 2002/0007949 A1 * | 1/2002 | Tolman et al. | 166/280 |
| 2006/0073980 A1 | 4/2006 | Brannon et al. | |
| 2006/0131022 A1 | 6/2006 | Rae | |
| 2008/0182761 A1 | 7/2008 | Stephenson et al. | |
| 2008/0289823 A1 * | 11/2008 | Willberg et al. | 166/280.2 |
| 2011/0114322 A1 | 5/2011 | Plasier et al. | |

FOREIGN PATENT DOCUMENTS

WO 2008092078 A1 7/2008

OTHER PUBLICATIONS

Aguiar et al., "New Clean up System for Gravel Pack Completions: A Synergy of a Unique Acid System and Special Rotating Jetting Tool", SPE 107003, 2007 SPE Latin American and Caribbean Petroleum Engineering Conference, Buenos Aires, Argentina, Apr. 15-18, 2007, 8 pages.
Cleary et al., "Field Implementation of Proppant Slugs to Avoid Premature Screen-Out of Hydraulic Fractures With Adequate Proppant Concentration", SPE25892, SPE Rocky Mountain Regional/ Low Permeability Reservoirs Symposium, Denver, CO, Apr. 12-14, 1993, 16 pages.
Malachowski et al., "Simulation of Well Productivity Losses Due to Near Well Condensate Accumulation in Field Scale Simulations", SPE 30715, SPE Annual Technical Conference & Exhibition, Dallas, TX, Oct. 22-55, 1995, 8 pages.
Rae et al., "Single Step Matrix Acidising With HF-Eliminating Preflushes Simplifies the Process, Improves the Results", SPE 107296, European Formation Damage Conference, Scheveningen, The Netherlands, May 30-Jun. 1, 2007, 9 pages.

* cited by examiner

*Primary Examiner* — Zakiya W Bates
(74) *Attorney, Agent, or Firm* — John Wilson Jones; Jones & Smith, LLP

(57) ABSTRACT

Multiple zones of a subterranean formation penetrated by a multi-zoned completed well may be fractured by pumping into one or more zones an acidizing solution at or above the fracturing pressure of the subterranean formation. After fractures are created or enhanced in the formation, a displacement fluid is pumped into the formation to farther advance the acidizing solution into the fractures.

15 Claims, No Drawings

METHOD OF INCREASING EFFICIENCY IN A HYDRAULIC FRACTURING OPERATION

FIELD OF THE INVENTION

The invention relates to a method of increasing the operational efficiency of a hydraulic fracturing treatment of a multi-zone subterranean formation by pumping into the formation an acidizing solution to create or enhance fracture geometry in the formation.

BACKGROUND OF THE INVENTION

Fracturing is a common stimulation method for increasing the production of hydrocarbons from subterranean formations penetrated by an oil, gas or geothermal well and is particularly suitable in the production of fluids and natural gas from low permeability formations. Typically in hydraulic fracturing, a fracturing fluid containing a proppant is injected into the well at a pressure which is sufficient to create or enlarge fractures within the subterranean formation. The proppant holds the fracture open during the recovery of hydrocarbons from the fractured formation.

Typically, the subterranean formation has a plurality of distinct production zones of interest. During production of fluids from the well, it usually is desirable to establish communication with only the zones of interest such that stimulation treatments do not inadvertently flow into a non-productive zone or a zone of diminished interest, Selective stimulation becomes pronounced as the life of the well declines and productivity of the well decreases.

With subterranean formations having multiple production zones of interest, the casing in a zone of interest, after being perforated and stimulated, must be hydraulically isolated before another zone of interest can be exploited. Isolation of zones often consists of inserting a mechanical plug below the zone of interest. The plug hydraulically isolates that portion of the well from a lower portion (or the rest) of the well. The isolation of the lower zone ensures that fracturing fluid pumped into the well is directed to the zone of interest.

Typically, fracture growth proceeds in those areas of the formation which exhibit the least amount of stress. As the fracture extends through the formation, it is not uncommon for the fracture to become misaligned from its original orientation, i.e., the orientation created when the fracture was initiated.

Near-wellbore tortuosity is the result of complex fracture geometry immediately surrounding the wellbore and can be caused by various factors including (a) misalignment of the wellbore or perforations with the far-field preferred fracture plane causing gradual or sharp fracture curvature in the near-wellbore region; (b) initiation of multiple fractures that compete for fracture width; (c) intersection of the hydraulic fracture with natural or drilling-induced fractures; or (d) fracture growth between the cement sheath and casing or cement sheath and formation due to inadequate cementing.

Tortuosity has been one of the biggest challenges for shale and tight gas hydraulic fracturing treatments, leading to high near-wellbore friction pressures, premature screenouts, reduced treating rates and poor production results. Several solutions have been applied with varying levels of success, but often result in nothing more than a frustrating attempt.

In light of the tortuosity of the pathway of the fracture, wellbore fluids require higher pumping rates and pressures in order that the fluid may surpass frictional forces created by the path. A common method to improve injection pressure prior to the fracturing treatment has been to pump small volumes (typically less than 10 bbls) of hydrochloric (HCl) or organic acid as "spearheads" in front of the fracturing treatment for the purpose of dissolving carbonate material and other soluble materials plugging the perforations.

High tortuosity can severely impact the effectiveness of multi-zone hydraulic fracturing treatments. In some cases, recovery of fluids from a zone is prohibited in light of the expense and time in combating tortuosity. In such cases, despite the zone having a promising return of fluid, the operator may make no attempt to recover any fluid from the zone. In other cases, a zone having the potential of high fluid return is sealed and isolated before the maximum amount of fluid is recovered.

High tortuosity during a fracture treatment further increases the surface treating pressure and consequently the injection pressure and hydraulic horsepower required to perform the fracturing treatment. Typically at in-situ conditions when stresses re-orient the direction of the fracture, increased pressure is needed in order to pump fluids into the fractures. This is especially the case when the well being treated is tight and/or likely to exhibit fractures with high tortuosity. In some cases, the required surface treating pressure for fracturing may exceed the surface equipment limitations, preventing a fracturing treatment from being performed.

Tortuosity also increases the risk of a premature screenout (early job termination) due to proppant bridging in the near-wellbore region. For this reason, the concentration of proppant may be lowered than what would otherwise be desired in order to avoid an early screenout, premature job termination and costly clean-out operation of the proppant from the wellbore before the fracturing of the next zone can be performed. The choking effect attributable to the complex fracture geometry near the wellbore can also significantly reduce productivity of the well.

Traditional methods of mitigating pre-existing tortuosity problems have included the pumping of proppant slugs (such as sand slugs) and/or viscous fluids into the fracture, re-perforating the fracture and sand-jetting. The most common have been the use of proppant slugs to either erode the fracture system or plug the less-conductive fractures and the pumping of highly viscous fluids to create extra fracture width. With both of these techniques, the proppant slug or viscous fluid is injected at fracturing rate and pressure and is proceeded by a step-down diagnostic injection/pressure falloff test to measure the amount of remaining tortuosity. The risk of screenout is often increased by pumping of proppant slugs. This may result in a costly and time-consuming clean-out in order to remove the sand from the wellbore before fracturing operations may be resumed. In severe cases where little or no improvement is shown, the perforated interval is isolated or abandoned and a new interval perforated with a different method with the hope of creating less tortuosity. The process is logistically complicated and requires tremendous time and the introduction of a high volume of fluid into each interval to be fractured.

Alternatives have therefore been sought for fracturing subterranean formations in multiple zones wherein at least one of the zones is impacted by high tortuosity. It is desirable that alternatives developed will not only improve fracturing efficiency but further be more operationally efficient by requiring less time and less expenditure than those presently offered.

SUMMARY OF THE INVENTION

The method of the invention consists of improving the efficiency of fracturing operations of subterranean formations penetrated by a multi-zoned completed well by pumping an acidizing solution at or above the fracturing pressure of the subterranean formation into one or more zones and then pumping a displacement fluid into the zone. The acidizing solution is considered a pre-fracturing fluid in the sense that it is introduced into the formation prior to introduction of the fracturing fluid. For each zone to be fractured, the acidizing solution, not the fracturing fluid, is used to create fractures in the formation prior to introduction of the fracturing fluid (or pad fluid).

In an embodiment, fracturing of multiple zones of a formation includes the pumping of a buffered acidizing solution at or above the fracturing pressure into a first zone of the formation to create or enlarge a fracture in the zone and then pumping a fluid into the zone which displaces the acidizing solution farther into the fracture. After recovery of fluid, the first zone is isolated and the process is then repeated in a second zone.

In another embodiment, fracturing of multiple zones of a formation includes pumping into a first zone of the formation in a single step an acidizing solution at or above the fracturing pressure of the formation and then pumping a displacement fluid into the zone. After recovery of fluid, the first zone is isolated and an acidizing solution is pumped into a second zone followed by a displacement fluid. The displacement fluid may be a pad fluid, a fracturing fluid or a combination of pad fluid and fracturing fluid.

In another embodiment, fracturing of multiple zones of a formation includes the use of one or more pumps to pump an acidizing solution into a first zone of the formation at or above the fracturing pressure of the formation and creating or enlarging a fracture in the zones and then pumping a displacement fluid into the zone. After isolation of the first zone, the process may be repeated for a second zone. The pumps may be operated continuously during the process. Since the pumps may be run continuously between the acidizing stage and the recovery stage, multi-zone treatments may be performed in a very short time which minimizes the risk of screenout.

In another embodiment, the operational efficiency in fracturing multiple zones of a subterranean formation penetrated by a multi-zoned completed well proceeds by reducing the tortuosity in one or more zones of the formation by pumping an acidizing solution at or above the fracturing pressure of a subterranean formation into the zone(s) to create or enlarge a fracture and then pumping a displacement fluid into the zone (s).

The use of the acidizing solution to create or enlarge fractures in zones of the formation reduces the treating pressure required for subsequent fracturing treatments, improves the wellbore/fracture connection, and reduces near-wellbore friction pressure.

The acidizing solution is an aqueous acidic solution of HF, HCl, a mud acid or an organic acid. In a preferred embodiment, the acidizing solution is an aqueous acid solution of HF. The acidizing solution may contain one or more phosphonate acids or salts as well as esters thereof.

A preferred acidizing solution is a non-precipitating formulation, i.e., a formulation which does not form damaging precipitates upon reaction with the formation, which may be pumped in a single stage without the need for acid preflushes or post-flushes. Since the acidizing solution may be non-precipitating, both the rock matrix and improved fracture system are left clean and in a non-damaged condition. The absence of a preflush, and optionally the absence of an over-flush, allows for minimal risk of undesired reactions with the reservoir rock. Further, by not requiring use of a preflush solution, the method reduces the generation of iron-based precipitates.

DETAILED DESCRIPTION OF THE PREFERRED EMBODIMENTS

Zones of a multi-zoned completed well may be separately treated in accordance with the method described herein. The method addresses complications which arise in the treatment of wells due to near-wellbore tortuosity. While injection pressure may be hampered by the prior art methods, injection pressure is highly likely to be improved (reduced) by the method described herein.

The method includes the step of pumping an acidizing solution into the well in order to create and/or enlarge fractures. The acidizing solution is pumped into the well prior to the introduction of the pad fluid (the fluid which typically does not contain proppant) and/or fracturing fluid (the fluid which typically contains proppant). The acidizing solution opens and/or widens the pathway created by the fracture wider and serves to decrease the friction pressure drop from the wellbore to the fracture. As a result, the pad fluid and/or fracturing fluid may be more easily pumped at lower pressures. The method described herein improves the injection rate and thus is especially useful in those instances where multiple narrow fractures are created in a zone of the formation.

The operating efficiency of the fracturing operation is improved since fracturing may proceed at lower pressures than would normally be required had the acidizing solution not have been used to create or enlarge fractures. Multiple zones of the formation and elongated fracture lengths may therefore be rapidly treated. The method allows the individual fracture treatments, or stages, to be performed in a rapid sequential succession. In most cases, it is not necessary to stop pumps between stages. This further improves the operating efficiency of the fracturing operation.

Since the method may be conducted at lower pressures, zones within the formation exhibiting tortuosity may be successfully fractured. The need to abandon a zone is greatly minimized and in most cases eliminated since less volume of fluid, lower pressure and less time is needed to successfully fracture the zone.

In conventional methods, increased pressures prevent increased loading of proppant in the fracturing fluid since an increase in proppant concentration requires greater injection rates for placement of the fracturing fluid into created or enhanced fractures. Unlike conventional systems which require the pressure to be increased to such an extent that it becomes difficult or impossible to pump fracturing fluid, the method described herein is characterized by a lower injection rate and thus permits completion of fracturing jobs in zones of high tortuosity.

Further, since the method of the invention requires a lower injection rate than required in conventional methods, a higher concentration of proppant may further be introduced into areas exhibiting high tortuosity or increased fracture length.

The method described herein may therefore use lower pressures than those used in prior art processes to impart the same result. In some instances, the method described herein has reduced the injection pressure by as much as 60%, compared to a conventional fracturing process for an equivalent fluid injection rate into the formation. When the fracturing operation defined herein is conducted at the maximum pressure allowed by surface equipment, the fluid injection rate which can be introduced into the formation is much higher. (For purposes herein, "maximum pressure" refers to the highest pressure which a fracturing operation may be conducted without damage to surface equipment.) This further enhances the efficiency of the fracturing operation. Further, in some instances, the rate of injection (injection rate) of the pad fluid and/or fracturing fluid has been increased two-fold over that of conventional methods at maximum pressure. Thus, the method of the invention provides for improved injectivity for completion of a fracturing job.

Further, the method of the invention provides high economic viability since an increased number of individual frac stages may be performed in a short period of time in a selected zone. Unlike traditional methods where an interval of high tortuosity is either by-passed or wherein tortuosity is reduced by time-consuming multiple injections of proppant slugs, viscous fluids and diagnostic tests, the method provided herein is simpler and easily addresses tortuosity problems in zones of completed multi-zoned wells.

The method described herein may be used in multi-zone formations penetrated by a horizontal well or a vertical well. A horizontal well, as used herein, refers to any deviated well. These wells can include, for example, any well which deviates from a true vertical axis more than 60 degrees. The method is particularly advantageous for use in horizontal wells.

Unlike matrix acidizing, where the acidizing solution is injected at matrix pressures (below fracturing pressure) in order to improve near-wellbore matrix permeability of the formation, the acidizing solution of the method defined herein is injected into the formation at a pressure greater than the pressure required to fracture the formation. In contrast, in matrix acidizing, fracturing of the formation is avoided since this would result in a less-efficient stimulation of the rock matrix. Additionally, since matrix acidizing solutions react with formation materials to form insoluble precipitates that can plug the matrix, special care is taken in matrix acidizing to avoid such reactions either through the use of acid pre- and post-flushes in order that these formation materials may be removed. Thus, in contrast to matrix acidizing, the method described herein provides for improved fracture connectivity by injecting the acidizing solution at high pressures sufficient to create fractures such that the acidizing solution without requiring pre-flushes or post-flushes.

In the method, a fracture is initiated in a zone of interest within a multi-zone completed well by injecting (preferably as a single-step) the acidizing solution.

The initiation of the fracture occurs at a sufficient pressure to create or enlarge a fracture within the zone. Fracture initiation occurs without the use of an acid preflush.

The acidizing solution treatment may be immediately followed by introduction of a pad fluid or a fracturing fluid for establishing increased fracture width and controlling initial fluid loss. The displacement of the acidizing solution by the pad fluid and/or fracturing fluid may be at a constant pumping rate or by using short pumping bursts. The proppant in the fracturing fluid holds the fracture(s) open during the recovery of the fluid from the formation. In some instances, it is unnecessary to use a pad fluid such that the fracturing fluid may be introduced into the formation without being preceded by a pad fluid.

The pumping rate for injecting the acidizing solution and pad fluid and/or fracturing fluid may be between from about 0.5 to about 100 bpm and can further be adjusted based on the size of the casing, the length of the well and the formation mechanical properties. Those skilled in the art having the benefit of this disclosure realize there are any variety of computer models and methods by which a suitable pumping rate may be determined.

Suitable fracturing fluids are any of those known in the art including linear and crosslinked fluids. Suitable proppants include any conventional proppant including relatively light-weight proppants (having an apparent specific gravity as low as 1.05) as well as conventional proppants such as sand, bauxite, ceramics, etc.

After recovery of the fluids within a zone of interest is completed, the zone of interest may be sealed off without stopping the pump(s). The zone may be sealed from other zones by conventional means such as by sliding sleeves and ball seats. Thus pumping during the operation may be continual as one zone is sealed and pumping in the next zone of interest commences.

The acidizing solution of the method defined herein improves the wellbore-fracture connection and reduces the tortuosity within the formation of the zone of interest. Injection of the acidizing solution lowers the treatment pressure in the fracturing job because the acidizing solution etches or dissolves part of the fracture face or the walls of the fracture and thereby creates a larger space for the pad fluid or fracturing fluid to pass and to be injected at a lower pressure. Thus, the use of the method described herein is highly beneficial in those formations characterized by tight or narrow fractures that are typically difficult to open and enlarge by conventional methods. Further, by reacting with the fracture surfaces, the acidizing solution cleans, enlarges, simplifies and improves the connectivity of the near-wellbore fracture system in the zone of interest of the multi-zone fracture completed well. Both viscous fluids and sand or proppant slugs and diagnostic tests are avoided. This, in turn, eliminates the possibility of a screenout and greatly simplifies the logistics of the operation.

The method further provides for greater efficiency in the fracturing of multiple zoned formations by providing multiple well fracture treatments. The method may be conducted in a well that has multiple zones, in some cases between 2 to 100. The speed with which the fracturing is being conducted does not permit the use of standard diagnostic tests for determination of degree of tortuosity. In addition, the method makes the pumping of proppant slugs and viscous fluids into the fracture, re-perforating the fracture or sand-jetting unnecessary. The method can be conducted without stopping in between the acidizing stage and the fracturing stage and without stopping between the fracturing stage, the sealing stage and the acidizing of the next zone of interest. Thus, the method provides increased operating efficiency with minimal delays. Further, by reducing near-wellbore tortuosity in each interval stage, the viability and success of the subsequent propped hydraulic fracture treatments are improved.

The acidizing solution typically is buffered and exhibits a pH between from about 1.9 to about 4.8, more typically between from about 2.5 to about 4.5. The acidizing solution is an aqueous acidic solution and of hydrofluoric acid (HF), hydrochloric acid (HCl) or a mud acid (a dilution of HF acid in HCl, typically prepared by dissolving ammonium bifluoride in HCl). While HCl is considered a strong acid, HF acid is, by definition, a weak acid being only partially dissociated in water, pKa=3.19. The acidizing solution may further be composed of a weak organic acid, such as acetic acid and formic acid, or combinations thereof. In a preferred embodiment, the acidizing solution is composed of an aqueous acid solution of HF.

The amount of acid in the acidizing solution is generally between from about 0.5 to about 20.0 weight percent, preferably between from about 1.5 to about 6.0 weight percent.

In a preferred mode, the acidizing solution, in addition to the HCl and/or HF, may contain an organic acid which assists in delaying reaction on clay minerals, thereby significantly slowing the HF acid reaction rate. Acidizing solutions may contain one or more phosphonate acids or salts as well as esters thereof. Such systems may contain phosphonate materials of the formula:

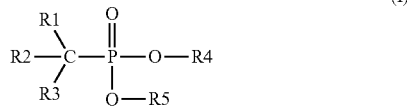

(I)

wherein R1, R2 and R3 may be hydrogen, alkyl, aryl, phosphonates, phosphates, acyl amine, hydroxy and carboxyl groups and R4 and R5 may consist of hydrogen, sodium, potassium, ammonium or an organic radical. The concentration of the phosphonate acid in the acidizing solution is generally between from about 0.25 to about 50.0, preferably from about 0.5 to about 6.0, more preferably about 3, percent by volume of the total solution without regard to the HF acid concentration.

Examples of these materials include aminotri(methylene phosphonic acid) and its pentasodium salt, 1-hydroxyethylidene-1,1-diphosphonic acid and its tetrasodium salt, hexamethylenediaminetetra(methylene phosphonic acid) and its hexapotassium salt, and diethylenetriaminepenta(methylene phosphonic acid) and its hexasodium salt. Among the commercial phosphonate materials, preferred are amino phosphonic acids, such as 1 hydroxyethylidene-1,1-diphosphonic acid, otherwise known as "HV acid," available in 60% strength as "DEQUEST 2010" from Monsanto Co.

The acidizing solution for use in the invention may further include an organic acid, such as citric acid, acetic acid, or formic acid as well as those set forth in U.S. Pat. No. 6,443,230, herein incorporated by reference. In a preferred mode, the acidizing solution contains both a phosphonate acid (set forth above) as well as the organic acid of this paragraph, in addition to the HCl and/or HF. The amount of organic acid in the acidizing solution is typically between from about 1 to about 50 weight percent.

The acidizing solution may further be one known in the art for matrix acidizing of non-carbonate formations. Such acidizing solutions include those disclosed in U.S. Pat. Nos. 5,529,125; 6,443,230; and 7,059,414, all of which are herein incorporated by reference. Such acidizing solutions react with the walls of the fracture and thereby enlarge or improve conductivity of the fracture and thereby improves the injectivity at fracturing rates.

In a most preferred embodiment, the acidizing solution is a buffered sandstone acid. This acid system uses a phosphonic acid, such as HEDP to hydrolyze a fluoride salt, $NH_4HF_2$, and has five hydrogens available that dissociate at different stoichiometric conditions and termed as "HV acid. Mixtures of HV acid and $NH_4HF_2$ produce an ammonium phosphonate salt and hydrogen fluoride. This acidizing solution does not form precipitates from metals in the formation such as calcium present in carbonate formations and thus is non-damaging. For instance, it was found that the acidizing solution of the invention does not precipitate CaF. This non-precipitating property of the acidizing solution prevents plugging of the fractures by the precipitate. Since the acidizing solution does not precipitate the fracture network is not plugged. It is believed that the acidizing solution described chelates calcium ions and prevents CaF precipitates from forming. Since the acidizing solution is non-precipitating and not damaging to the formation, it may easily be displaced into the formation without any overflush or postflush (no over-displacement).

Immediately after the acidizing solution is injected into the formation, the pad fluid or fracturing fluid is introduced. Thus, the pad fluid or fracturing fluid slowly displaces the acidizing solution deeper into the fracture. Typically, the pad fluid or fracturing fluid is pumped into the fracture at a similar rate as the acidizing solution is pumped.

The lower reactivity rate of the acidizing solution allows it to react both with the formation clays and with quartz with deeper penetration, when pumped at fracturing rates, which results in tortuosity reduction or elimination. On the other hand, conventional acid systems, whether HCl or HF, would react and spend immediately with calcium carbonate and clays, resulting in poor or no tortuosity reduction.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

The buffered acid system used in the Examples was BJ Sandstone Acid ("BJSSA") or half-strength sandstone acid, commercially available as BJ HSSA, both of which are products of Baker Hughes Incorporated. These products are described in U.S. Pat. No. 7,059,414.

The fracturing fluid in each of the Examples was an aqueous fluid containing either a linear gel or a crosslinked gel.

EXAMPLES

Example 1

The potential for severe tortuosity was noted in a vertical tight gas well which prevented the required pump rate from being reached while staying below the surface treating pressure limitation. The acid treatment consisted of first injecting a spacer composed primarily of 3% ammonium chloride water and then injecting 120 bbl of 5% BJ Sandstone Acid (5% HF acid equivalent strength), available from Baker Hughes Incorporated. Another spacer of 3% ammonium chloride water was then introduced followed by displacement with 2% KCl water to the top of perforations. After a one-hour shutdown, the treatment was further displaced (over-displaced) in 10 steps of 12 bbl each, with an hour shutdown between steps. An injectivity test, above the fracture gradient, was conducted prior to every acid pumping, to enable evaluation of the injectivity before and after the treatment. After the acid treatment, another injectivity test was performed, followed by a step-down test, in order to measure the improvement after treatment. Pressure drops at similar rates improved significantly. For example, at 12 bpm the pressure drop was reduced by 700 psi after the acid treatment, and at 16 bpm the pressure drop was reduced by 600 psi. The pressure decreases allowed for increased pump rates to the designed level while holding pressures to the levels seen before the acid treatment. A very low-permeability, tight gas reservoir, with a low porosity, a high Young's modulus and a high fracture gradient as set forth in Table I which shows the six fracture stages of the well.

TABLE I

|  | Depth (m) | Porosity | Permeability (mD) | Young Modulus (psi), $10^6$ | BHST, °F. | Reservoir Pressure (psi) | Frac. Gradient (psi/ft) |
|---|---|---|---|---|---|---|---|
| Stage 1 | 4103 to 4107.5 | 4.2% | 0.00065 | 5.60 | 268 | 7087 | 0.95 |
| Stage 2 | 4030 to 4042 | 4.2% | 0.004 | 6.53 | 262 | 6941 | 0.92 |
| Stage 3 | 3959 to 3071<br>3949.7 to 3050.7 | 4.1% | 0.00022 | 6.90 | 260 | 6830 | 0.84 |
| Stage 4 | 3894 to 3895<br>3884 to 3888.5 | 4.8% | 0.0006 | 7.20 | 257 | 6680 | 0.95 |
| Stage 5 | 3712 to 3716.5 | 6.8% | 0.0011 | 6.07 | 250 | 6581 | 0.934 |
| Stage 6 | 3495 to 3498.5 | 5.6% | 0.0006 | 5.73 | 240 | 6180 | 0.933 |

After the first injectivity test, it was realized that performing the fracture stimulation as designed would be difficult due to the high surface pressure requirements in combination with the limitations on the wellhead and well configuration. Although the desired protocol called for a minimum pump rate of 20 bpm to perform the job, the maximum achievable rate was no more than 15.6 bpm at 12,100 psi. The maximum allowable surface pressure was 12,500 psi. After the acid treatment, significant pressure decreases were observed, allowing increases in pump rates to the designed level while holding pressures to the levels seen before the acid treatment. Table II sets forth the data for the injectivity tests before and after the acid treatments and shows that injection rates were improved by 25 to 100 percent wherein $Q_{max}$ represents fluid injection rate in bpm; $P_{max}$ represents surface injection pressure in psi; and DP Tot NW represents total near-wellbore delta-pressure (pressure drop) in psi.

TABLE II

| Fracture Stage | Before or After BJ Sandstone Acid Treatment | Qmax (bpm) | Pmax (psi) | DP Tot NW (psi) |
|---|---|---|---|---|
| 1 | Before | 15.6 | 12.276 | 1.807 |
|  | After | 19.3 | 12.135 | 1.117 |
| 2 | Before | 16.2 | 12.300 | 1.800 |
|  | After | 20.5 | 11.051 | 1.481 |
| 3 | Before | 11.8 | 11.682 | 1.808 |
|  | After | 24.4 | 11.824 | 1.898 |
| 4 | Before | 14.5 | 12.216 | 2.815 |
|  | After | 20.7 | 11.350 | 1.187 |
| 5 | Before | 20.6 | 12.037 | 1.791 |
|  | After | 24.5 | 12.320 | 1.492 |
| 6 | Before | 21.7 | 11.718 | 2.164 |
|  | After | 25.2 | 11.760 | 1.416 |

The fracturing fluid used for stages 1 and 2 was a linear gel and a crosslinked borate gel. The fracturing fluid for stages 3, 4, 5 and 6 was slickwater.

Example 2

Low-permeability, vertical oil wells having the potential for severe tortuosity were subjected to treatment at multiple perforated intervals. Each zone was treated with BJ Sandstone Acid (1.5% HF acid equivalent strength). In order to measure the effect, a minifrac was first performed with a borate crosslinked gel. A 30-bbl BJ Sandstone Acid pre-frac volume was then injected, followed by the main fracture treatment. In this way, measurements of the treating pressure before (during the minifrac) and after the BJ Sandstone Acid treatment (during the pad of the main frac treatment) were obtained, at the same fracturing pump rate. In each case, the BJ Sandstone Acid treatment was performed by injecting the first 15 bbl at 3 bpm, and the final 15 bbl was injected at the prevailing fracturing rate. The BJ Sandstone Acid was followed directly by the main fracturing treatment, without any shut down time or soaking period. The fracturing fluid was a borate crosslinked gel. Table III summarizes the fracturing treating pressures before (minifrac) and after (main frac) the acid treatment as well as the pressure reduction in each of the zones. In 14 out of the 15 cases, the fracturing pressure was significantly reduced by the acid treatment, when pumping at a similar or the same treating rate and using the same fracturing fluid.

TABLE III

| Well | Perforated Interval | | Before | After | Pressure reduction |
|---|---|---|---|---|---|
| 1 | 1 | Q bpm | 17 | 17 | |
|  |  | P psi | 5053 | 4600 | 453 psi |
|  | 2 | Q bpm | 13.7 | 13.7 | |
|  |  | P psi | 2125 | 1945 | 180 psi |
|  | 3 | Q bpm | 13.7 | 13.8 | |
|  |  | P psi | 2560 | 2311 | 249 psi |
|  | 4 | Q bpm | 13.9 | 14 | |
|  |  | P psi | 1963 | 1563 | 400 psi |
|  | 5 | Q bpm | 13.6 | 14.5 | |
|  |  | P psi | 2618 | 3200 | −582 psi |
| 2 | 1 | Q bpm | 14.7 | 14.7 | |
|  |  | P psi | 3231 | 2700 | 531 psi |
|  | 2 | Q bpm | 15.6 | 15.5 | |
|  |  | P psi | 3212 | 2897 | 315 psi |
|  | 3 | Q bpm | 17 | 17.5 | |
|  |  | P psi | 3700 | 1433 | 2267 psi |
|  | 4 | Q bpm | 17 | 17.6 | |
|  |  | P psi | 2460 | 1763 | 697 psi |
|  | 5 | Q bpm | 17 | 17 | |
|  |  | P psi | 2480 | 1859 | 621 psi |
| 3 | 1 | Q bpm | 15 | 15 | |
|  |  | P psi | 3300 | 2900 | 400 psi |
|  | 2 | Q bpm | 17 | 17 | |
|  |  | P psi | 3700 | 3000 | 700 psi |
|  | 3 | Q bpm | 17 | 17 | |
|  |  | P psi | 3650 | 3000 | 650 psi |
|  | 4 | Q bpm | 18 | 18 | |
|  |  | P psi | 3140 | 2700 | 440 psi |
|  | 5 | Q bpm | 16 | 16 | |
|  |  | P psi | 4430 | 4000 | 430 psi |

From the foregoing, it will be observed that numerous variations and modification may be effected without departing from the spirit and scope of the novel concepts of the invention.

What is claimed is:
1. A method of fracturing a multi-zone subterranean formation penetrated by a well which comprises:
(a) injecting into a first zone of the subterranean formation in a single-step a buffered HF sandstone acidizing solution, wherein the buffered HF sandstone acidizing solution is injected at a pressure sufficient to create or enlarge at least one fracture in the first zone;

(b) injecting a pad fluid, a fracturing fluid or both a pad fluid and a fracturing fluid and displacing the buffered HF sandstone acidizing solution farther into the created or enlarged fracture wherein:
(i) a pre-flush is not injected into the first zone before step (a); and
(ii) a post-flush is not injected into the first zone after step (a);
(c) sealing the first zone from other zones in the formation;
(d) repeating steps (a), (b) and (c) in at least one other zone of the multi-zone subterranean formation.

2. The method of claim 1, wherein the pH of the buffered HF sandstone acidizing solution is between from about 1.9 to about 4.8.

3. The method of claim 2, wherein the pH of the buffered HF sandstone acidizing solution is between from about 2.5 to about 4.5.

4. The method of claim 1, wherein the buffered HF sandstone acidizing solution comprises a phosphonate of the formula:

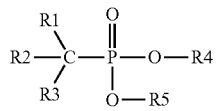

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical.

5. The method of claim 4, wherein the buffered HF sandstone acidizing solution comprises an acid selected from the group consisting of citric acid, acetic acid, formic acid and mixtures thereof.

6. The method of claim 5, wherein the buffered HF sandstone acidizing solution comprises from about 1 to about 50 weight percent citric acid, up to about 20 weight percent HF and from about 0.5 to about 50 weight percent phosphonate compound.

7. A method of fracturing a multi-zone subterranean formation penetrated by a horizontal well or a vertical well which comprises:
(a) injecting into a first zone of the subterranean formation a buffered HF sandstone acidizing solution, wherein the buffered HF sandstone acidizing solution is injected at a pressure sufficient to create or enlarge at least one fracture in the first zone wherein the at least one fracture is defined by a fracture face and a fracture wall;
(b) etching or dissolving at least a portion of the fracture face or fracture wall of step (a) with the buffered HF sandstone acidizing solution;
(c) injecting a pad fluid, a fracturing fluid or both a pad fluid and a fracturing fluid into the first zone and displacing at least a portion of the buffered HF sandstone acidizing solution further into the created or enlarged fracture;
(d) sealing the first zone;
(e) repeating steps (a), (b), (c) and (d) in at least one other zone in the multi-zone subterranean formation.

8. The method of claim 7, wherein the buffered HF sandstone acidizing solution has a pH between from about 1.9 to about 4.8.

9. The method of claim 7, wherein the buffered HF sandstone acidizing solution comprises a phosphonate of the formula:

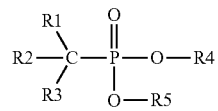

wherein R1, R2 and R3 are independently selected from hydrogen, alkyl, aryl, phosphonates, phosphates, acyl, amine, hydroxy and carboxyl groups and R4 and R5 are independently selected from hydrogen, sodium, potassium, ammonium or an organic radical.

10. The method of claim 9, wherein the buffered HF sandstone acidizing solution further comprises an organic acid selected from the group consisting of citric acid, formic acid, acetic acid and mixtures thereof.

11. The method of claim 10, wherein the buffered HF sandstone acidizing solution comprises from about 1 to about 50 weight percent citric acid, up to about 20 weight percent HF and from about 0.5 to about 50 weight percent phosphonate compound.

12. A method of decreasing tortuosity in multiple zones of a subterranean formation penetrated by a multi-zoned completed well which comprises:
(a) pumping with one or more pumps into a first zone of the subterranean formation a buffered HF sandstone acidizing solution, wherein the buffered HF sandstone acidizing solution is pumped at a pressure sufficient to create or enlarge at least one fracture in the first zone and further wherein a pre-flush is not pumped into the first zone;
(b) advancing the buffered HF sandstone acidizing solution farther into the created or enlarged fracture by pumping with one or more pumps of step (a) a pad fluid, a fracturing fluid or both a pad fluid and a fracturing fluid into the first zone;
(c) sealing the first zone;
(d) repeating steps (a), (b) and (c) in at least one other zone in the multi-zone subterranean formation,
wherein tortuosity in each zone is reduced by the creation or enlargement of the fracture by the acidizing solution.

13. The method of claim 12, wherein the buffered HF sandstone acidizing solution comprises from about 1 to about 50 weight percent citric acid, up to about 20 weight percent HF and from about 0.5 to about 50 weight percent phosphonate compound.

14. The method of claim 12, wherein a post-flush is not injected into the first zone after step (a).

15. The method of claim 12, wherein the one or more pumps are run continuously throughout steps (a) through (c).

* * * * *